(12) United States Patent
Yang et al.

(10) Patent No.: US 6,725,347 B2
(45) Date of Patent: Apr. 20, 2004

(54) SPIN-WHEEL SDRAM ACCESS SCHEDULER FOR HIGH PERFORMANCE MICROPROCESSORS

(75) Inventors: Liuxi Yang, Sunnyvale, CA (US); Duong Tong, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 403 days.

(21) Appl. No.: 09/760,678

(22) Filed: Jan. 16, 2001

(65) Prior Publication Data

US 2002/0138687 A1 Sep. 26, 2002

(51) Int. Cl.[7] .............................................. G06F 12/00
(52) U.S. Cl. ....................... 711/167; 711/105; 711/154; 711/109; 711/110; 710/58; 710/61; 710/52; 713/500; 713/600
(58) Field of Search ................................. 711/105, 167, 711/106, 109, 110; 713/502, 500, 600; 710/58, 61, 52, 154, 36, 39, 40; 709/102, 103

(56) References Cited

U.S. PATENT DOCUMENTS

| 5,367,678 | A | * | 11/1994 | Lee et al. ................... 709/104 |
|---|---|---|---|---|
| 5,684,978 | A | | 11/1997 | Sarma et al. ................ 395/496 |
| 5,905,876 | A | * | 5/1999 | Pawlowski et al. ......... 710/112 |
| 6,061,757 | A | * | 5/2000 | Arimilli et al. ............. 710/264 |
| 6,088,772 | A | * | 7/2000 | Harriman et al. ........... 711/158 |
| 6,098,159 | A | | 8/2000 | Kawaguchi et al. ........ 711/167 |
| 6,285,962 | B1 | * | 9/2001 | Hunter ....................... 702/117 |
| 6,317,813 | B1 | * | 11/2001 | Su et al. ..................... 711/158 |
| 6,324,624 | B1 | * | 11/2001 | Wolrich et al. ............. 711/152 |
| 6,378,049 | B1 | * | 4/2002 | Stracovsky et al. ......... 711/147 |
| 6,532,509 | B1 | * | 3/2003 | Wolrich et al. ............. 710/240 |
| 2002/0065981 | A1 | * | 5/2002 | Jenne et al. ................ 711/105 |
| 2002/0129196 | A1 | * | 9/2002 | Volk et al. | |

OTHER PUBLICATIONS

International Search Report dated Apr. 23, 2003 ( 1 page).

* cited by examiner

Primary Examiner—Hong Kim
(74) Attorney, Agent, or Firm—Rosenthal & Osha L.L.P.

(57) ABSTRACT

A memory control unit has been developed. The control unit includes a command "spin wheel" which schedules the order of read and write commands to the memory. It also includes a read "spin wheel" which ensures proper timing of the read commands and a write "spin wheel" which ensures proper timing of the write commands.

13 Claims, 11 Drawing Sheets

Command Wheel

Read Sample Wheel

Write Push Wheel

FIG. 5

Spin-Wheel

Command Wheel

Read Sample Wheel

Write Push Wheel

SPIN-WHEEL SDRAM ACCESS SCHEDULER FOR HIGH PERFORMANCE MICROPROCESSORS

FIELD OF THE INVENTION

The present invention generally relates to microprocessor access to outside memory and in particular to a design of an on-chip memory controller in a computer system that optimizes memory access.

BACKGROUND OF THE INVENTION

In computer operations, a memory control unit (MCU) associated with a microprocessor performs input/output transactions with an outside memory device. The microprocessor may operate alone, or may operate in a multi-processor environment. The target outside memory device, in current systems, is typically a Synchronous Dynamic Random Access Memory (SDRAM). With rapid advances in integrated circuits involving semiconductor technologies, it is now possible to integrate the MCU inside the microprocessor chip. This integration of the MCU allows the MCU to operate at the speed of the processor clock, which is many times faster than the clock speed at which the SDRAM operates.

The memory in the SDRAM is organized in banks. Typically, the number of memory banks may range from 4 to 16 or more. Corresponding to each of these SDRAM banks, there is a memory request queue in the MCU. A memory request basically involves a Row Address Strobe (RAS) command and a Column Address Strobe (CAS) command for accessing data in a memory bank. The MCU has a request scheduler and a RAS/CAS generator which will process requests for all the memory banks in an orderly and timely manner. For correct and efficient SDRAM access, ensuring correct timing of issuing these RAS/CAS commands is critical.

In a SDRAM, after a single memory access, each bank has to perform a precharge operation for memory refresh before a new RAS command can be sent. This means that there is no new memory request to this bank during the precharge operation. However, while one bank is busy doing the precharge, the request scheduler could initiate a RAS command for another bank. A SDRAM will have many memory banks and, correspondingly, a MCU will be handling as many request queues. The request scheduler of the MCU must resolve all timing conflicts among different banks and sort through the legal combinations in time so that the RAS and CAS commands are formed and issued at the right time for each and every bank.

Implementation of a memory request scheduler for a MCU becomes increasingly complex as the number of memory banks increases. For example, arbitrating among 4 banks requires sorting through 4096 possibilities to get a legal and optimum setting. Therefore, a software implementation will be very slow and inefficient. There exists a need for a method that can be implemented in the hardware so as to achieve optimum SDRAM access performance at a very low hardware cost.

SUMMARY OF THE INVENTION

In some aspects the invention relates to an apparatus for controlling a memory device comprising: a command spin wheel that schedules a read or a write command for the memory device; a read spin wheel that ensures correct timing of the read command; and a write spin wheel that ensures correct timing of the write command.

In an alternative embodiment, the invention relates to an on-chip memory control unit for an SDRAM that serves a plurality of microprocessors, comprising: a command spin wheel that schedules read and write commands on a SDRAM command bus in a first-in, first-out order, the command spin wheel comprising, an auto-incremental release pointer, an auto-incremental CAS pointer, and an auto-incremental schedule pointer; a read spin wheel that ensures a proper timing sequence of a read command in a first-in, first-out order, the read spin wheel comprising, a data read request pointer, and a schedule pointer; and a write spin wheel that ensures a proper timing sequence of a write command in a first-in, first-out order, the write spin wheel comprising, a data push request pointer, and a schedule pointer.

In an alternative embodiment, the invention relates to an apparatus for controlling a memory device comprising: means for scheduling a read command or a write command for the memory device; means for ensuring a proper timing sequence for the read command; and means for ensuring a proper timing sequence for the write command.

In an alternative embodiment, the invention relates to a method for controlling a memory device comprising: scheduling a read or a write command for the memory device; ensuring a proper timing sequence for a read command; and ensuring a proper timing sequence for a write command.

The advantages of the invention include, at least, a multiple memory bank request sorting problem has been decomposed into a much simpler problem of data structures handled with logic circuits. The complicated timing design and access-scheduling problem has a slow, software-based solution. With this invention, it is now possible to implement a very fast, hardware-based solution, which can be realized in an on-chip MCU. By time efficient use of memory control and data buses, computer memory access performance of a MCU can now be optimized.

BRIEF DESCRIPTION OF THE DRAWINGS

FIG. 5 is a timing diagram showing various timing signals involved in a read operation.

DETAILED DESCRIPTION OF THE INVENTION

The present invention relates to a method and a hardware implementation for efficient scheduling of memory requests to external memory chips in computer input/output operations. In the embodiments discussed, the MCU is resident in the microprocessor. However, the invention is equally applicable to an off-chip MCU. The MCU may operate in a single processor environment or in a multiprocessor environment. The hardware implementation involves several special registers in the MCU. The registers are organized as wrap-around counters and are used in the design of an access scheduler for access to external memory. In the embodiments discussed herein, the external memory is a Synchronous Dynamic Random Access Memory (SDRAM), although the invention is applicable to any appropriate type of memory device. These special registers are referred to herein as 'wheels'. Exemplary embodiments of a hardware implementable access scheduler design are illustrated with the help of the following Figures and Tables.

Figure 1:
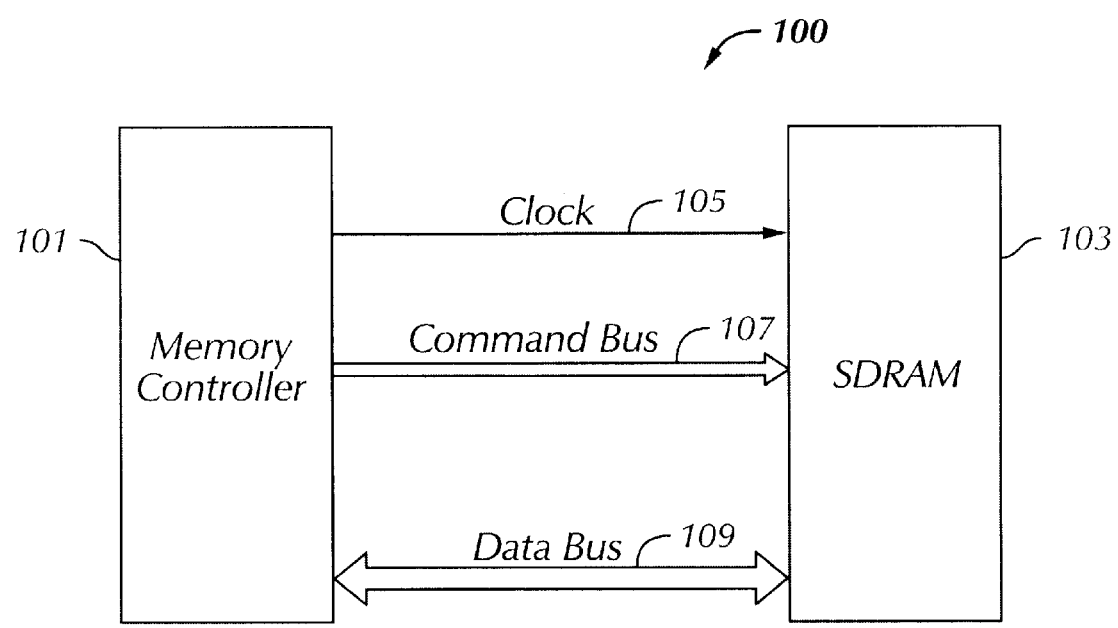
FIG. 1 is a prior art schematic diagram showing signaling between a memory controller and a SDRAM

FIG. 1 depicts a prior art memory subsystem 100 in a multiprocessor computer system. In this system, the Memory Controller Unit (MCU) 101 is on-chip. When the memory controller is on-chip, it improves local memory access latency. In addition, a multiprocessor system can take advantage of the aggregated bandwidth of multiple MCUs. The communicating signals between the MCU 101 and the SDRAM 103 are organized into three groups. The clock signal 105 is responsible for controlling the commands and data to be sampled synchronously. Command bus 107 includes the signals that form SDRAM access commands for memory reads and writes. The command bus 107 is unidirectional from the MCU 101 to the SDRAM 103. A bi-directional data bus 109 connects the MCU and the SDRAM. For a memory read, data are transferred on data bus 109 from SDRAM to the MCU. For a memory write, data are transferred on data bus from the MCU to the SDRAM. The command and data are to be sampled synchronously. The clock signal makes that synchronous computer operation possible.

Because it takes a finite amount of time for the electrical signals to travel along these communicating paths, and because the electrical devices take time to respond, the communication signals driven by the MCU cannot be seen immediately by the SDRAM, and vice versa. Various time delays arising out of signal propagation delays and device response times depend on the actual physical layout of the microprocessor, the SDRAM chips, and the interconnections involved. Therefore, the signal delays between a MCU and a SDRAM vary from system to system. Further, because of signal driving differences and differences in nature and number of signals in their own groups, the time delays among clock, command bus and data bus signals are also different. Therefore, signal timing designs must take into account all time delays for correct and reliable communications.

Figure 2:
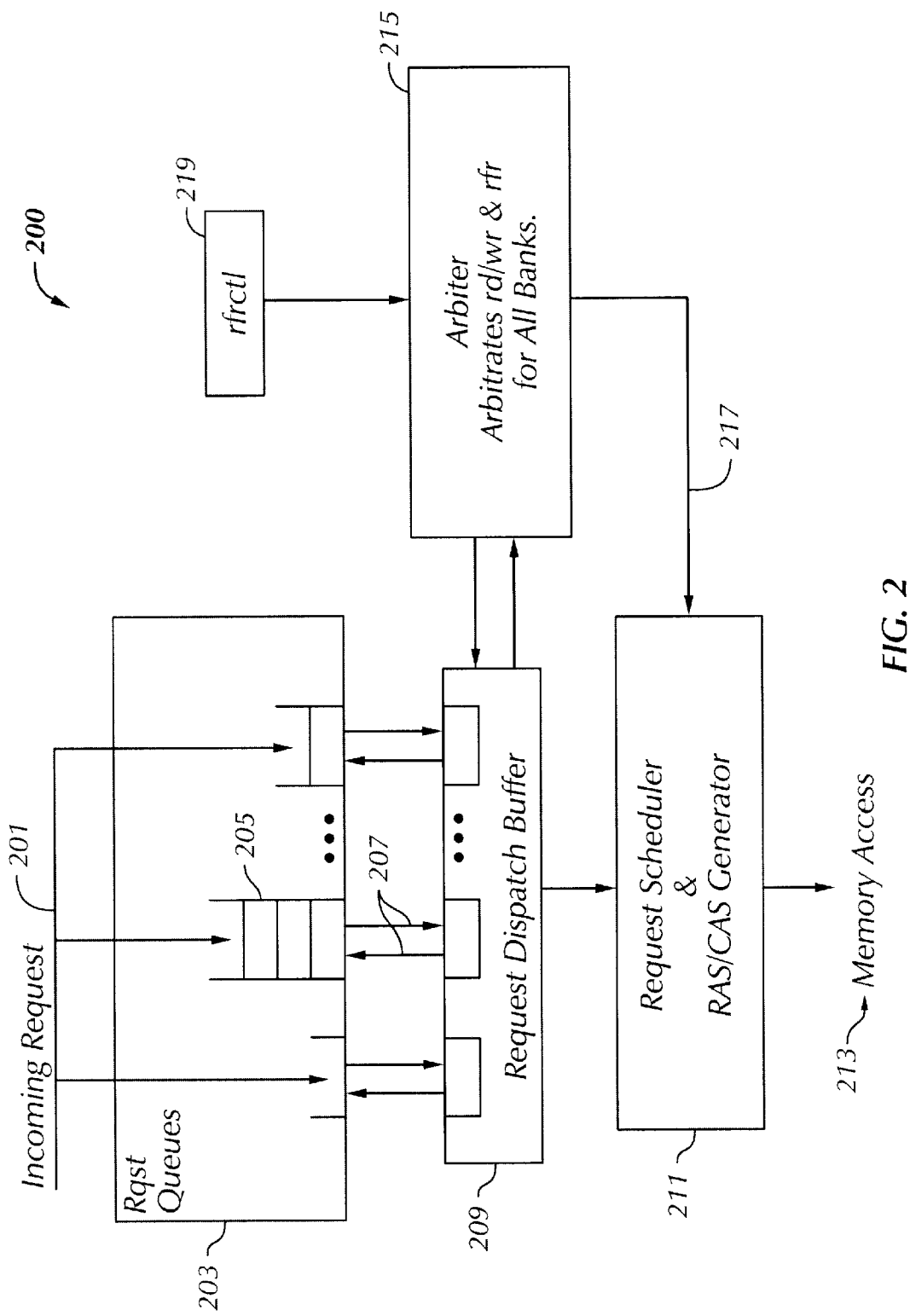
FIG. 2 is a diagram showing internal memory controller architecture.

FIG. 2 is a simplified description of an embodiment of an MCU 200 that will be resident in a microprocessor integrated circuit chip. The MCU places the incoming requests 201 in the request queues 203. Corresponding to each of the memory banks in a SDRAM there is a request queue 205. Usually, each queue manages the memory request going into one particular memory bank because there is no dependency between any two different banks. With queues for different banks, the memory requests can be issued to the different memory banks with interleaving. Although each MCU resides in one particular processor, it will respond to memory requests from any processor connected to the same system interface so long as the request's address is mapped by the memory controller. Once a request is ready to be issued to the memory, it is sent (207) to the request dispatch buffer 209 under the control of the MCU arbiter 215. Under the arbiter control (217), RAS and CAS will be formed and scheduled in the request scheduler 211. The arbiter 215 also pipes memory refreshes (219) to the request scheduler 211. The request scheduler sends out RAS/CAS commands to the memory 213.

TABLE 1

| Parameter | Typical Time (ns) | Comment |
|---|---|---|
| tRCD | 26 | RAS to CAS delay |
| tRP | 26 | Row pre-charge time |
| tRAS | 52 | Row active time |
| tRC | 78 | Row cycle time |
| tSAC2max | 7 | CLK to valid data out conflict |
| tOH2 | 2.5 | Output data hold CL = 2 |
| tCH | 3 | Clock high pulse time |
| tCL | 3 | Clock low pulse time |
| tSS | 2 | Input setup time |
| tSH | 1 | Input hold time |
| tSLZ | 0 | CLK to output active |
| tSHZ2min | 2 | CLK to hi-Z min, CL = 2 |
| tSHZ2max | 6 | CLK to hi-Z max, CL = 2 |
| tTmin | 1 | Min CLK transition time |
| tTmax | 5 | Max CLK transition time |
| tWR2 | 10 | Write recovery time |
| tCCD | 12 | Col to Col delay time |
| tRRD | 20 | Row to Row delay time |
| tRSC | 26 | Mode register set cycle time |

Table 1 describes various time delay specifications of a typical SDRAM. The list describes various operational time delay parameters, their notations and time duration. Only some of the specifications are used in the access scheduler design described here.

Figure 3:
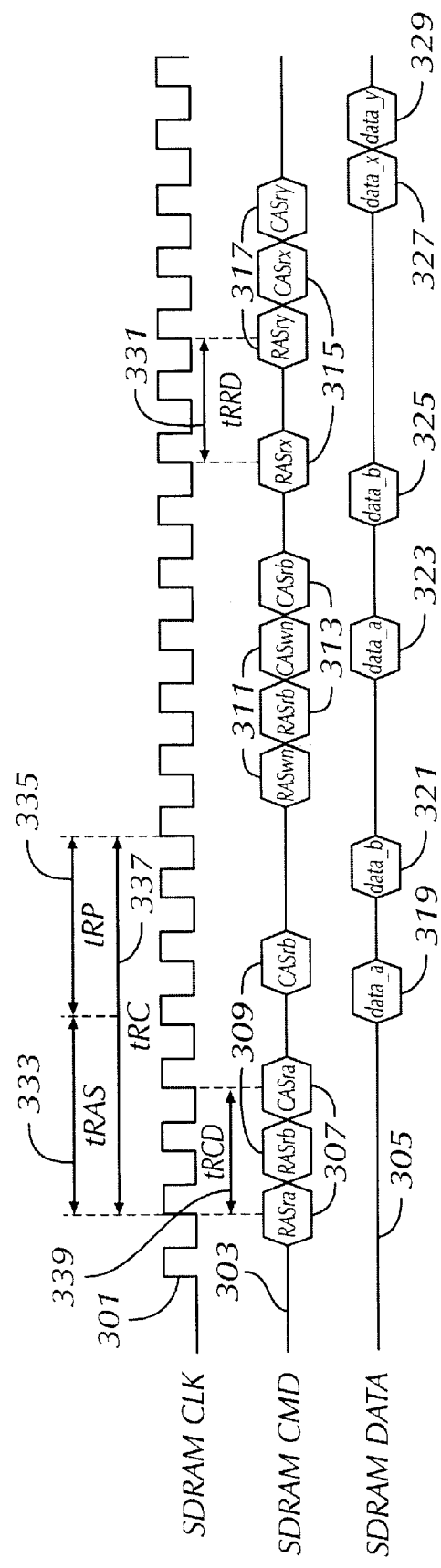
FIG. 3 is a timing diagram showing SDRAM read and write access patterns.

FIG. 3 shows a SDRAM clock signal 301, a SDRAM command signal 303 and a SDRAM data signal 305. A few exemplary SDRAM read and write access examples are marked with numbers 307, 309, 311, 313, 315, and 317. Accesses 307, 309, 313, 315, and 317 are read accesses. Access 311 is a write access. Read command 307 corresponds to the read data 319; read command 309 corresponds to the read data 321; read command 311 corresponds to the read data 323; read command 313 corresponds to the read data 325; read command 315 corresponds to the read data 327; and read command 317 corresponds to the read data 329. Auto-precharge of SDRAM banks for both read and write operations is used. For a read access, the memory controller needs first to drive a RAS command, and then a CAS command. The delay between RAS and CAS must follow the SDRAM specification: RAS to CAS delay time tRCD 339. After the CAS command, its data can be sampled some time later according to the SDRAM CAS latency. For a write access, the memory controller first issues a RAS command then issues a CAS command. Again, the delay between the RAS and CAS must follow the SDRAM spec tRCD. The written data must be driven on the data bus in the same cycle as the CAS command. Because access 307 and 309 are accessing banks on different chips, their RAS and CAS commands can be back-to-back. This is also the case with access 311 and access 313. This is called external bank interleaving. Access 315 and access 317, on the other hand, are accessing banks within the same chip. This is called internal banking. For internal banks, RAS commands must satisfy row to row delay time tRRD (331). For any given bank, the RAS commands have to follow rules for row active time tRAS (333), row precharge time tRP (335), row cycle time tRC (337), and RAS to CAS delay time tRCD (339).

Figure 4:
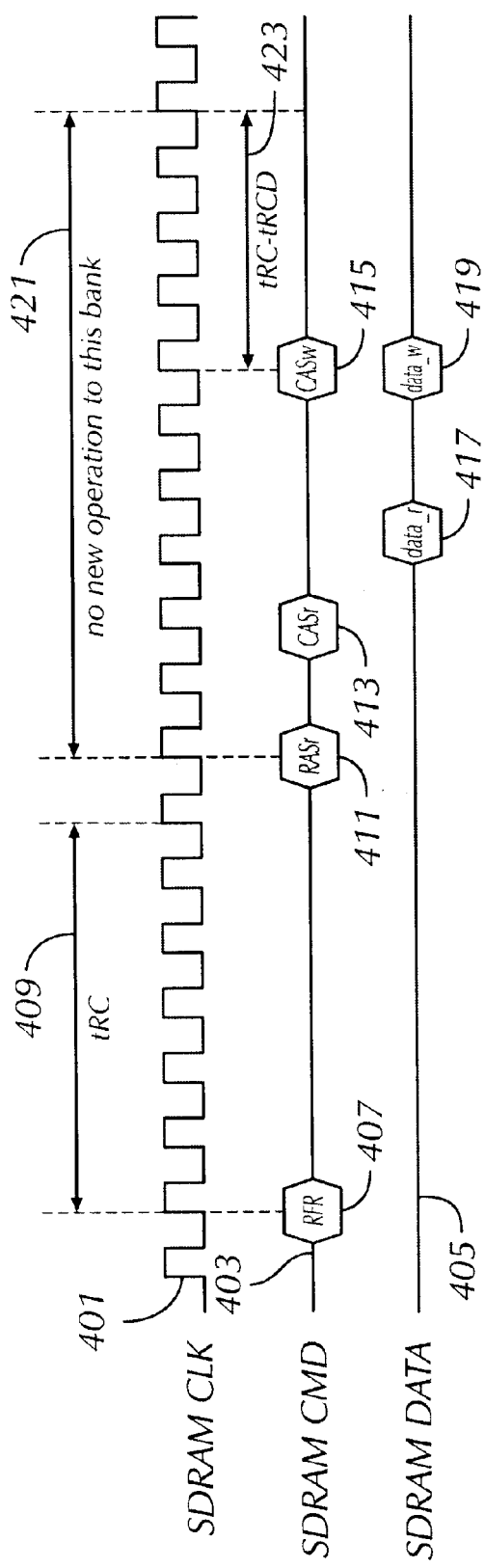
FIG. 4 is a timing diagram showing auto-refresh and read-modifying write operations initiated by the memory controller.

FIG. 4 is a timing diagram of auto-refresh and Read-Modifying-Write (RMW) operations. The diagram shows a clock signal 401, a SDRAM command signal 403 and a SDRAM data signal 405. RMW is a special operation to support large scale distributed shared memory multiprocessors. The operation does not actually modify the data; it only manipulates the read and write permissions on one particular cache line. As far as the memory controller is concerned, data can be written back to memory right away. In this figure, signal group 407 is the auto-refresh operation (RFR). When an auto-refresh is issued, the memory scheduler needs only to observe the row cycle time tRC 409 to block the next request to the same bank. A command signal group of 411, 413, and 415 make up the RMW request. To speed up the RMW, the first CAS operation 413 is an "open-page" CAS, i.e., a CAS without auto-precharge. The second CAS 415 is a CAS with auto-precharge. Although there are no timing constraints preventing the second CAS from being issued right after the first CAS, the read data 417 has to be sampled before it can be written back (419). The extra SDRAM cycle between the two data is for the read-write turn-around time on the data bus. There is no new operation to the bank for the duration 421 until the time (tRC-tRCD), 423 has elapsed after the second CAS command 415.

TABLE 2

| Parameter | Description (all delay in SDRAM cycles) |
| --- | --- |
| act_rd_dly | Read command RAS to CAS delay |
| act_wr_dly | Write command RAS to CSA delay |
| rd_cycl_dly | Read pre-charge delay |
| wr_cycl_dly | Write pre-charge delay |
| rd_wait | Read data valid extension (de-assert CKE) |
| auto_rfr_cycle | wait for auto refresh finishes |
| rd_rd_dly | delay for a read allowed to other banks after current read |
| rd_wr_dly | delay for a write allowed to other banks after current read |
| wr_rd_dly | delay for a read allowed to other banks after current write |
| wr_wr_dly | delay for a write allowed to other banks after current write |
| rrd | RAS to RAS delay of SDRAM internal banks |
| wr_cycl_dly | wait tRP after a read command is issued |
| rd_smp_dly | wait to sample a read data |

Table 2 lists the related programmable registers in the memory controller unit. There are other programmable parameters, such as refresh control and SDRAM initialization parameters, which are not listed. The register settings are obtained by executing an optimization algorithm that guarantees that there are no timing conflicts in the data bus.

Figure 5:
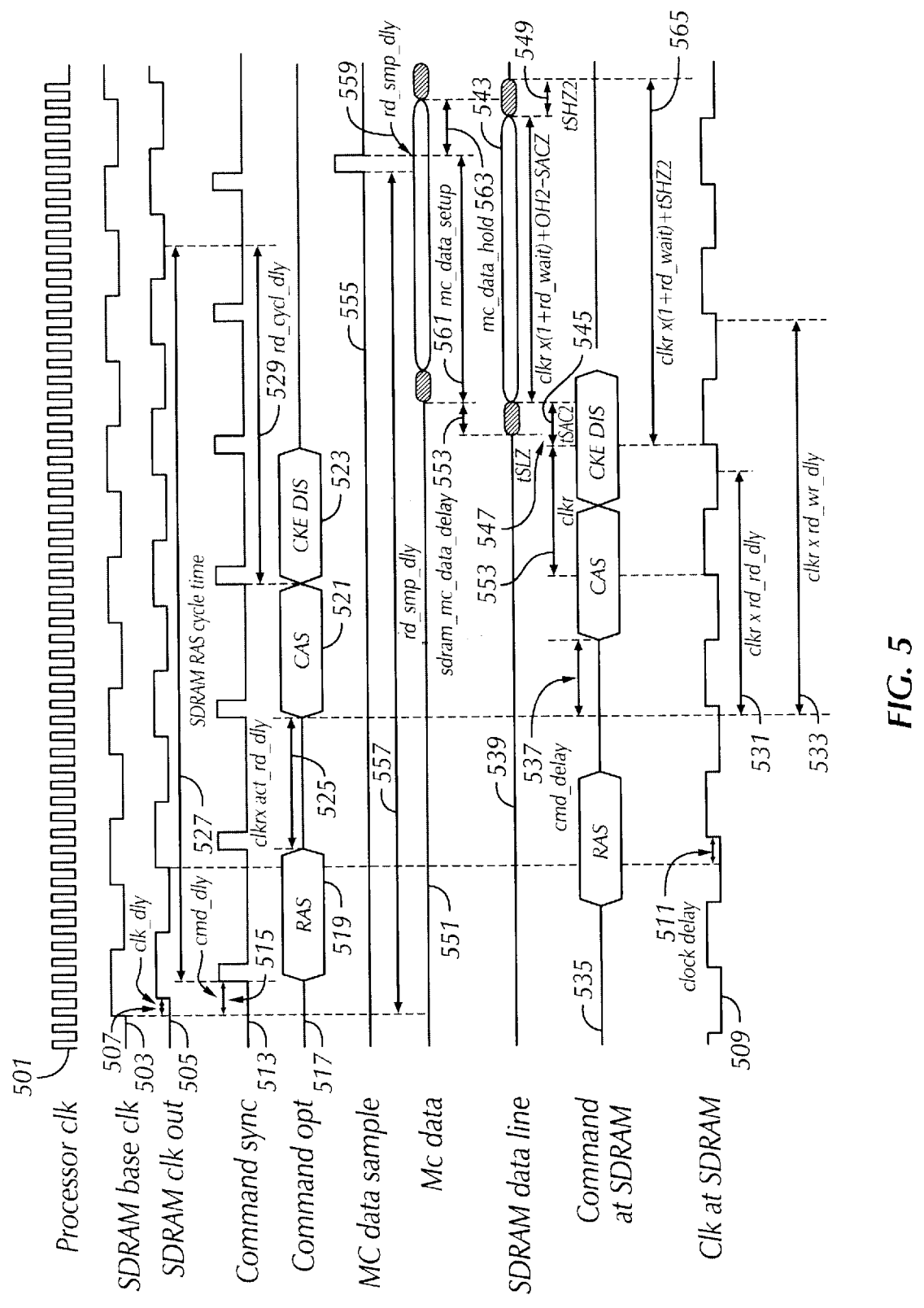

FIG. 5 is a simplified version of a SDRAM read timing diagram. For this exemplary embodiment, the timing diagram reveals the details of timing requirements and constraints involved in a read transaction between a MCU and a SDRAM bank.

The first signal 501 is the processor internal clock. The second signal 503 is the memory controller internal base SDRAM clock. The SDRAM clock period is always a multiple of the processor clock period. The third signal line 505 represents the SDRAM clock at the MCU I/O pin. It has a programmable delay, clk_dly 507, with respect to the internal SDRAM base clock 503. A programmable delay is introduced to design correct timing of I/O signals. The SDRAM clock-out signal 505 at the MCU, reaches the SDRAM I/O pins as the tenth signal 509 after a propagation time delay, clock delay 511.

The fourth signal 513 is the SDRAM command sync signal (at the MCU location). All SDRAM commands must be synchronous to this signal. It also has a programmable delay, cmd_dly 515, with respect to the internal SDRAM base clock 503. The fifth signal 517 represents a command output at the MCU I/O pins for a SDRAM bank. There are three commands on the command bus: a RAS command 519; a CAS command 521; and a CKE DIS command 523. There is a time delay, clkr x act_rd_dly 525, between the RAS and the CAS commands. After a read command for a SDRAM bank begins at the MCU there has to be a time delay in the amount of tRC, SDRAM RAS cycle time 527, during which no new transaction to that bank can take place. This time delay 527 corresponds to a read precharge delay, rd_cycl_dly 529, after the CAS command 521 has been issued to this SDRAM bank. Once a read CAS command 521 is issued, there needs to be a time delay, clkr x rd_rd_dly 531, before a new read CAS can be issued at the MCU for other SDRAM banks. Similarly, once the read CAS command 521 is issued, there needs to be a time delay, clkr x rd_wr_dly 533, before a new write CAS can be issued at the MCU for other SDRAM banks.

The command out signal 517 at the MCU reaches the SDRAM pins as the ninth signal 535 after a propagation time delay, cmd_delay 537. The command 535 at SDRAM produces a data, the eighth signal 539, at the SDRAM I/O pins. When the CKE DIS command 523 is executed immediately after the CAS command 521 (one SDRAM clock delay 541), the data-valid state 543 in the SDRAM data line 539 is extended by one SDRAM cycle. The valid data state in the SDRAM data line 539 begins after a time delay tSAC2-representing clock to valid data-out conflict tSAC2 545. This time delay 545 includes clock to output-active time delay tSLZ 547. The SDRAM data line 539 must be provided with a time delay tSHZ2 549, to return to the normal state before another valid data is placed on the SDRAM data line. The seventh signal 551 is the SDRAM data 539 reaching the MCU I/O pins after a time delay, sdram_mc_data_delay 553. The sixth signal 555 is the MCU data sampling signal. The memory read data would be sampled into the MCU after a wait, rd_smp_dly 557, with respect to the SDRAM internal base clock 503. With respect to the falling edge 559 of the MCU data sampling signal 555, the MCU read-in data must have a data setup time, mc_data_setup 561, and a data holdup time, mc_data_hold 563 for correct and reliable data transfer. A minimum time delay, (clkr x (1+rd_wait)+tSHZ2) 565, is required before next command could be issued at the SDRAM bank.

Figure 6:
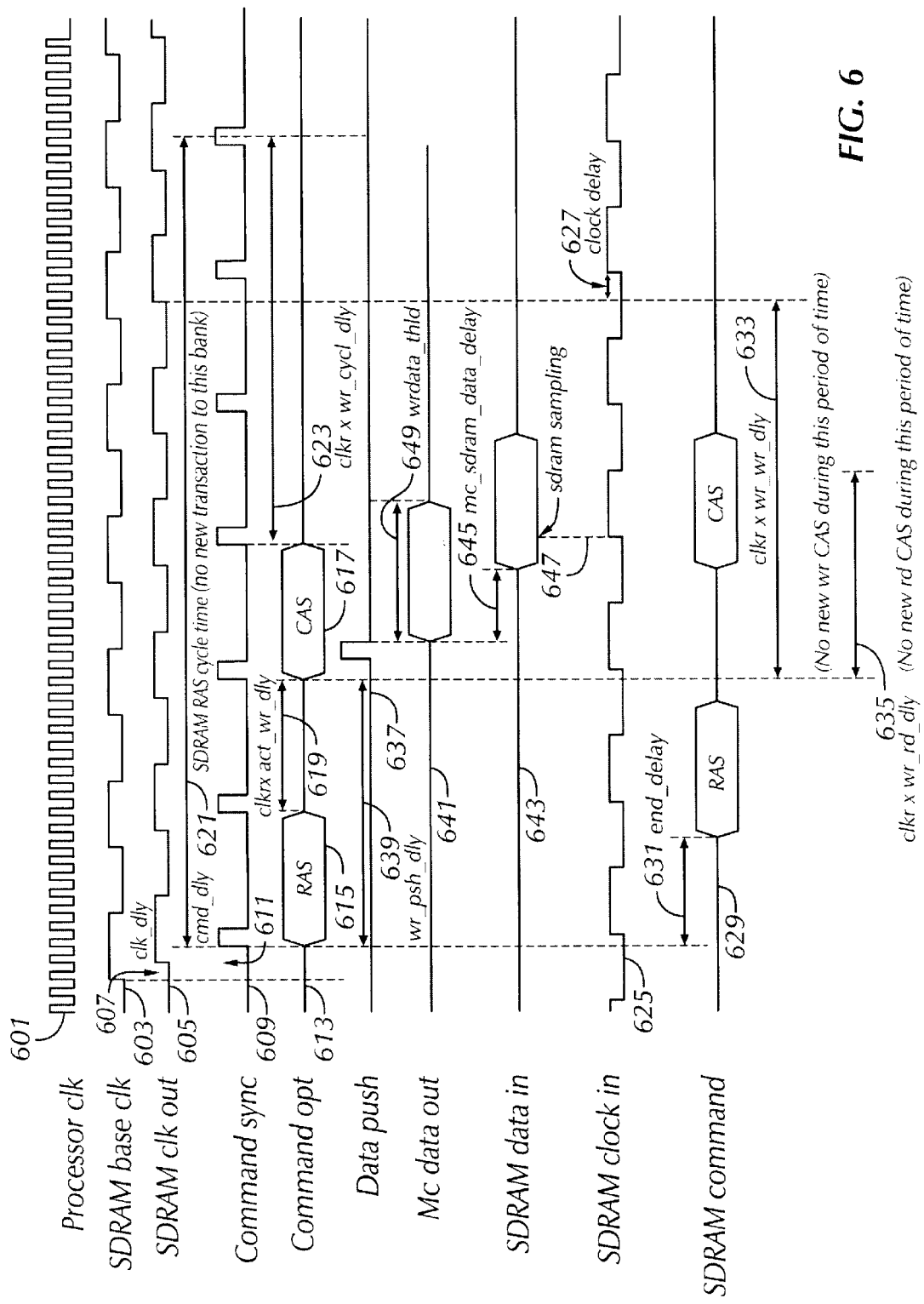
FIG. 6 is a timing diagram showing various timing signals involved in a write operation.

FIG. 6 is a simplified version of a SDRAM write timing diagram. For this exemplary embodiment, the timing diagram reveals the details of timing requirements and constraints involved in a write transaction between a MCU and a SDRAM bank. The first signal 601 is the processor internal clock. The second signal 603 is the MCU internal base SDRAM clock. The SDRAM clock period is always a multiple of the processor clock period. The third signal line 605 represents the SDRAM clock at MCU I/O pin. It has a programmable delay, clk_dly 607, with respect to the internal base SDRAM clock 603. The fourth signal 609 is the SDRAM command sync signal. All SDRAM commands issued by the MCU must be synchronous to this signal. It has a programmable delay, cmd_dly 611, with respect to the internal base SDRAM clock 603. The fifth signal 613 represents a MCU command output at memory controller I/O pins. There are two commands on the command bus for write operation: a RAS command 615; and a CAS command 617. The CAS command 617 must begin after a time delay, clkr x act_wr_dly 619. The next row command for a new write/read operation for the same SDRAM bank can begin only after a time delay tRC 621. This delay corresponds to a write precharge time delay of (clkr x wr_cycl_dly) 623 necessary after the write CAS command 617.

The SDRAM clock-out signal 605 reaches the SDRAM clock-in pins as the ninth signal 625, after a propagation time delay, clock_delay 627. The SDRAM command-out signal 613 at the MCU reaches the SDRAM I/O pins as the tenth signal 629 after a propagation time delay, cmd_delay 631. Once a write CAS command 617 is issued at a MCU there has to be a time delay, clkr x wr_wr_dly 633, before a new write CAS could be issued at the MCU for other banks. Similarly, once a write CAS command 617, is issued at a MCU there has to be a time delay, clkr x wr_rd_dly 635, before a new read CAS could be issued at the MCU for other banks. The sixth signal 637 is a data push (write) signal. The memory write data will be driven out from the MCU with a programmable time delay, wr_psh_dly 639, with respect to the SDRAM internal base clock 603 at the MCU. This programmable time delay 639 is designed such that the following timed events take place with correct precision.

The seventh signal 641 is the SDRAM data-out at the MCU I/O pins. This MCU data-out signal 641 from the MCU arrives at the SDRAM as the data-in signal 643 after a time delay, mc_sdram_data_delay 645. The data-in signal 643 at the SDRAM I/O pin is sampled at a rising edge 647 of the SDRAM clock-in signal 625. The SDRAM data-in signal 643 must be held for the duration, wrdata_thld 649, so that the data could be transferred reliably to the designated SDRAM bank.

FIGS. 7a, 7b, 7c, and 7d describe four special registers configured as counters that make up an exemplary embodiment of a request scheduler of a MCU. These special counters are designated as wheels. These wheels essentially function as timekeepers in the hardware processing of memory requests. The memory requests for each memory bank is processed by the request scheduler in an orderly manner, satisfying all timing constraints for reliable and efficient access by the processors.

Figure 7A:
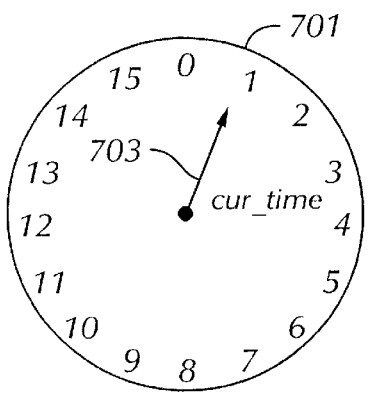
FIGS. 7a-7d shows four special register counters designated as wheels in accordance with one embodiment of the invention.

FIG. 7a describes spin-wheel 701. This spin wheel 701 free runs at the SDRAM clock rate. Essentially, it is a digital counter that acts as a free-running digital clock with SDRAM clock period as the time unit. Each SDRAM clock pulse, trigger its "arm", cur_time 703, to point to the next number. For example, it currently points to 1. In the next SDRAM cycle it will point to 2. Therefore, as time goes on, it points to 1, 2, . . . 15, 0, 1, . . . so on and so forth. In hardware implementation it is just a simple 4-bit wrap-around counter. The counter size is decided by the maximum number of SDRAM cycles that a bank occupies. Normal memory access time is the row cycle time tRC. When CKE is deasserted for read (command CKE DIS), row cycle time tRC should be extended accordingly for the sake of correct timing. Because CKE is allowed to be deasserted for at most three SDRAM cycles and tRC for all the SDRAM used is under twelve SDRAM cycles, a 4-bit counter is generally more than enough in the spin-wheel.

Figure 7B:
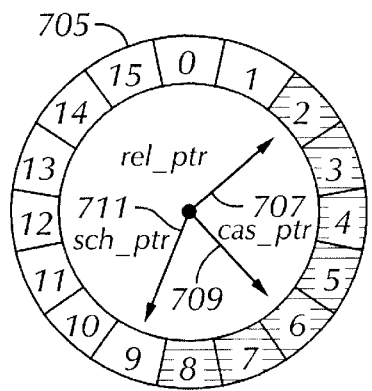

FIG. 7b describes a command wheel 705. The command wheel involved in scheduling commands is just a plain register file with three (two read and one write) auto-increment pointers: release pointer, rel_ptr 707 and CAS pointer, cas_ptr 709 are read pointers. Schedule pointer, sch_ptr 711 is a write pointer. The command wheel is essentially a timekeeper for scheduling commands on the SDRAM command bus. The command wheel forms two First-In First-Out (FIFO) queues for time ordered response in command scheduling. One queue is for bank reactivation scheduling and is called a release queue. A bank is locked up until it is released when the row cycle time, tRC, constraint is satisfied and the release pointer rel_ptr 707 moves forward a position. The other command wheel queue is a queue for CAS scheduling, and is called the CAS queue. Once a CAS command is issued, the pointer cas_ptr 709 moves a position forward. If sch_ptr 711, the schedule pointer equals any of the pointers rel_ptr 707 or cas_ptr 709, then the corresponding queue is empty. The operation of the command wheel is further explained with the help of FIG. 8 below.

Figure 7C:
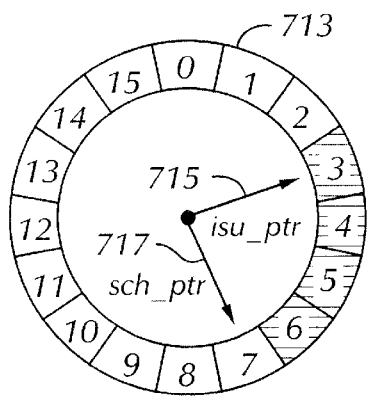

FIG. 7c describes a read sample wheel 713. The read sample wheel 713 is a plain register file with two pointers. The isu_ptr 715 is a read pointer and the sch_ptr 717 is a write pointer. This wheel is essentially a timekeeper of data sample for read requests. This read sample wheel forms a single queue (FIFO) of data sample for read requests. Every time a read data request is issued for processing, the isu_ptr 715 advances one step. If isu_ptr 715 equals the sch_ptr 717 in the read sample wheel, it indicates that the data sample request queue is empty.

Figure 7D:
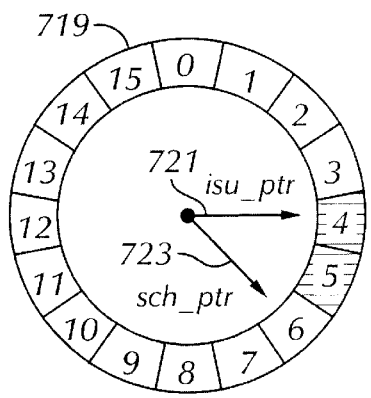

FIG. 7d describes a write push wheel 719. The write push wheel 719 is a plain register file with two pointers. The isu_ptr 721 is a read pointer and the sch_ptr 723 is a write pointer. This wheel is essentially a timekeeper of data push for write requests. This write push wheel forms a single queue (FIFO) of data push for write requests. Every time a write data push request is issued for processing, the isu_ptr 721 advances one step. If isu_ptr 721 equals the sch_ptr 723 in the write push wheel it indicates that the data write push request queue is empty.

Since data access times are different for read and write operations, having two different wheels, one for read and one for write, supports a high bandwidth data switch path. There is no time ordered relationship between read and write request scheduling. Having two separate timekeeping wheels, one for read request and one for write request, only introduces extra hardware costs in terms of implementing two sch_ptrs and index duplications. All memory operations consist of at most two commands except for read-modify-write. When an operation is scheduled, the first part is issued to the memory. The second part is written in command wheel 705 with issuing timestamp and release timestamp. If it is a read, read sample wheel 713 is also updated for the entry pointed by the sch_ptr 717. Similarly, if it is a write, the write push wheel is also updated for the entry pointed by the sch_ptr 723. Obviously, the command wheel, the read wheel and the write wheels are not in synchronism. The SDRAM clock period, with which the spin wheel operates, is always a multiple of the processor clock period. In the description of this preferred embodiment, this number (the clock ratio, clkr) is larger than eight. To simplify register and logic designs in the above-mentioned wheels, a time-sharing technique for read from and write to the registers is used. Register size in each of the wheels is chosen to be larger than or equal to the maximum possible queue size. This eliminates the problem of controlling overflow of memory bank requests.

Figure 8:
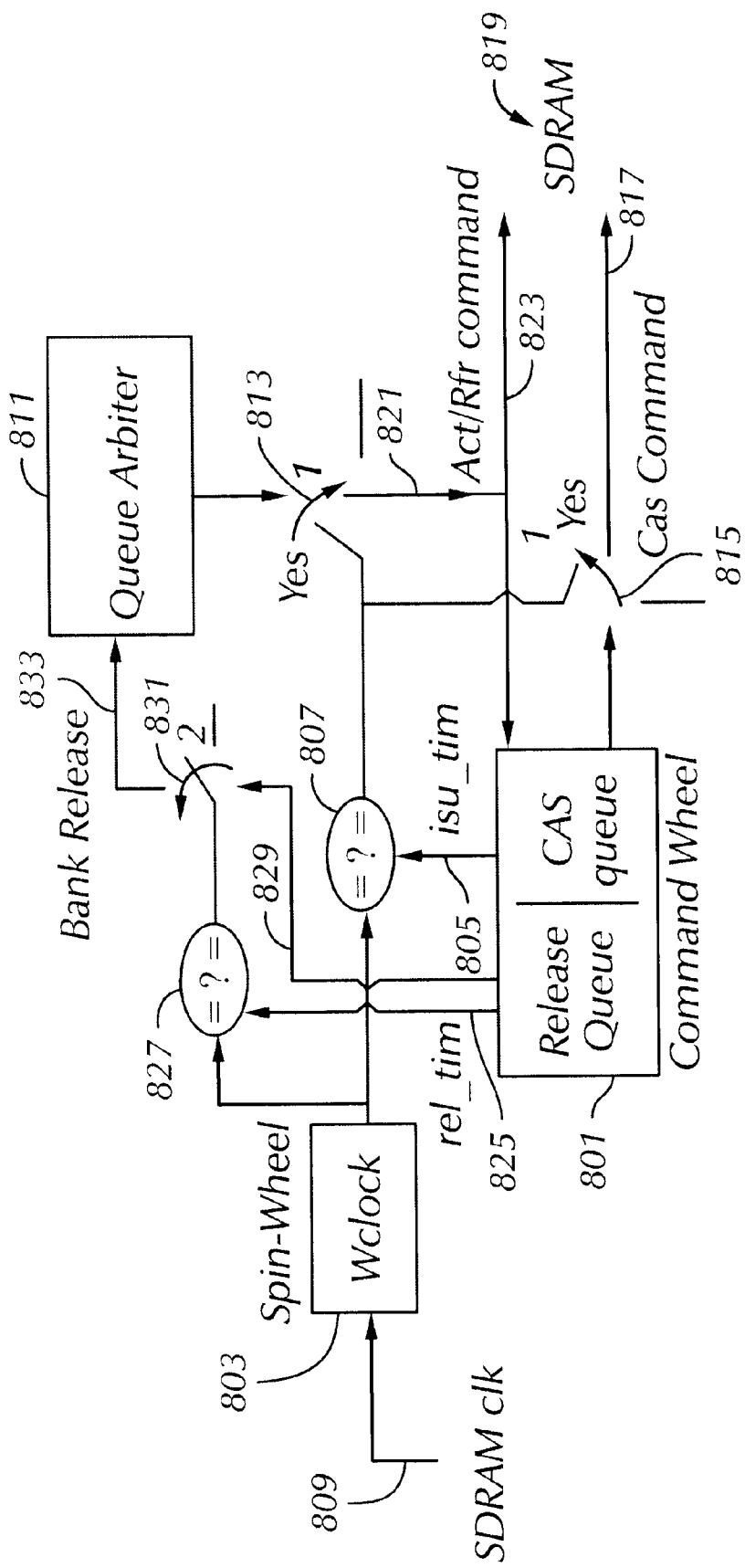
FIG. 8 describes operation of a command scheduler.

FIG. 8 is a schematic description of how a command wheel 801 operates along with a spin wheel 803. It provides a description that is hardware implementable in an on-chip MCU. Each entry in the command wheel has the following contents:

bnk_num: tells which bank to send the CAS command;
rqst_type: 2-bit encoding for the request type (rd—read, ord—open-page read, rfr—auto-refresh, and wr—write);
isu_tim: issue timestamp;

isu_adr: issue address, i.e., and CAS address (this field is not used for the auto-refresh command); and rel_tim: timestamp for releasing the bank.

In this embodiment, the following are the rules for scheduling a new command:

A command is scheduled into the command wheel only when its first part (RAS) is issued;

An auto-refresh command can only be issued when the CAS queue is empty;

A command is blocked if a CAS is scheduled by a previous command; and

If a SDRAM does not support row-to-row delay time tRRD=one SDRAM cycle, the internal bank interleaving schedule will only be allowed when the CAS queue is empty.

The isu_tim is calculated as follows:

Let wclock be the spin-wheel time. Let last_isu_tim be the predecessor's isu_tim, then, the isu_tim is obtained by:

if (CAS queue is not empty) begin
case ({predecessor's CAS type, new rqst's CAS type})
{wr, wr}: isu_tim=last_isu_tim+wr_wr_dly;
{wr, rd}: isu_tim=last_isu_tim+wr_rd_dly;
{rd, wr}: isu_tim=last_isu_tim+rd_wr_dly;
{rd, rd}: isu_tim=last_isu_tim+rd_rd_dly;
end case
end else begin
if (current CAS type=rd) isu_tim=wclock+act_rd_dly;
else isu_tim=wclock+act_wr_dly;
end The delay parameters are defined in Table 2. They are pre-programmed in the MCU. For the auto-refresh command, the isu_tim field is ignored.

The rel_tim is obtained as follows:

case ({CAS type});
rd: rel_tim=isu_tim+rd_cyd_dly;
wr: rel_tim=isu_tim+wr_cyd_dly;
rfr: rel_tim=auto_rfr_cycle;
endcase Obviously, rel_tim is not needed for an ord CAS command.

Referring again to FIG. 8, the first (memory request) entry's isu_tim 805 of the CAS queue is compared (807) with wclock, the SDRAM clock time 809 registered by the spin wheel 803. The queue arbiter 811 sends out new requests one at a time. If wclock equals isu_tim, the request coming from Queue Arbiter 811 is blocked by switch 813. Simultaneously, the switch 815 then allows CAS command to be sent (823) to the SDRAM 819. Otherwise the new request can pass through (821) to the CAS queue of the command wheel 801. The first part of the new command is sent (823) to SDRAM 819; the second part is scheduled in the CAS queue if applicable. The rel_tim of the new command is also set and put in the release queue of the command wheel 801. The rel_tim 825 of the first entry in the release queue is also compared (827) with wclock 803 the SDRAM clock time 809 registered by the spin wheel 803. Once there is a match, Command Wheel 801 acknowledges (829) to the queue arbiter 811 through switch 831 and path 833 that SDRAM 819 is ready for accepting a new request from one particular bank.

There is a special case for RWM operation. For the simplicity of manipulating memory bank read/write permissions in the data switches, it is not allowed to have other CAS commands in between a RWM's two CAS commands. This is achieved by generating a fake RAS command right after the RAS command of RWM is sent to the SDRAM. The first RAS schedules the ord (open page read) command. The fake RAS command schedules the write command. The rules discussed above, guarantee that no other CAS commands will be in between the two CAS commands. A fake RAS will not impact the performance because a RWM introduces large gaps on the control bus.

It is also worth mentioning that by only allowing the refresh command to get in the release queue when the CAS queue is empty, a refresh command sneaking in between two CAS commands is avoided.

In conventional timing control, individual scheduling circuit is assigned for each memory bank. This will lead to high chip real estate cost for on-chip MCU and will also introduce potential timing problems. In conventional design the scheduling must be made by sorting through all timing constraints at once. Such a strategy might lead to a critical timing path situation.

Command wheel size is determined by the maximum number of pending SDRAM requests. As discussed earlier, a RMW generates two CAS commands. A safe way is to have the command wheel size be twice the size the supported SDRAM banks. Of course, one can use a counter to flow-control the new requests from the arbiter, which will allow the wheel size to be smaller.

Figure 9A:
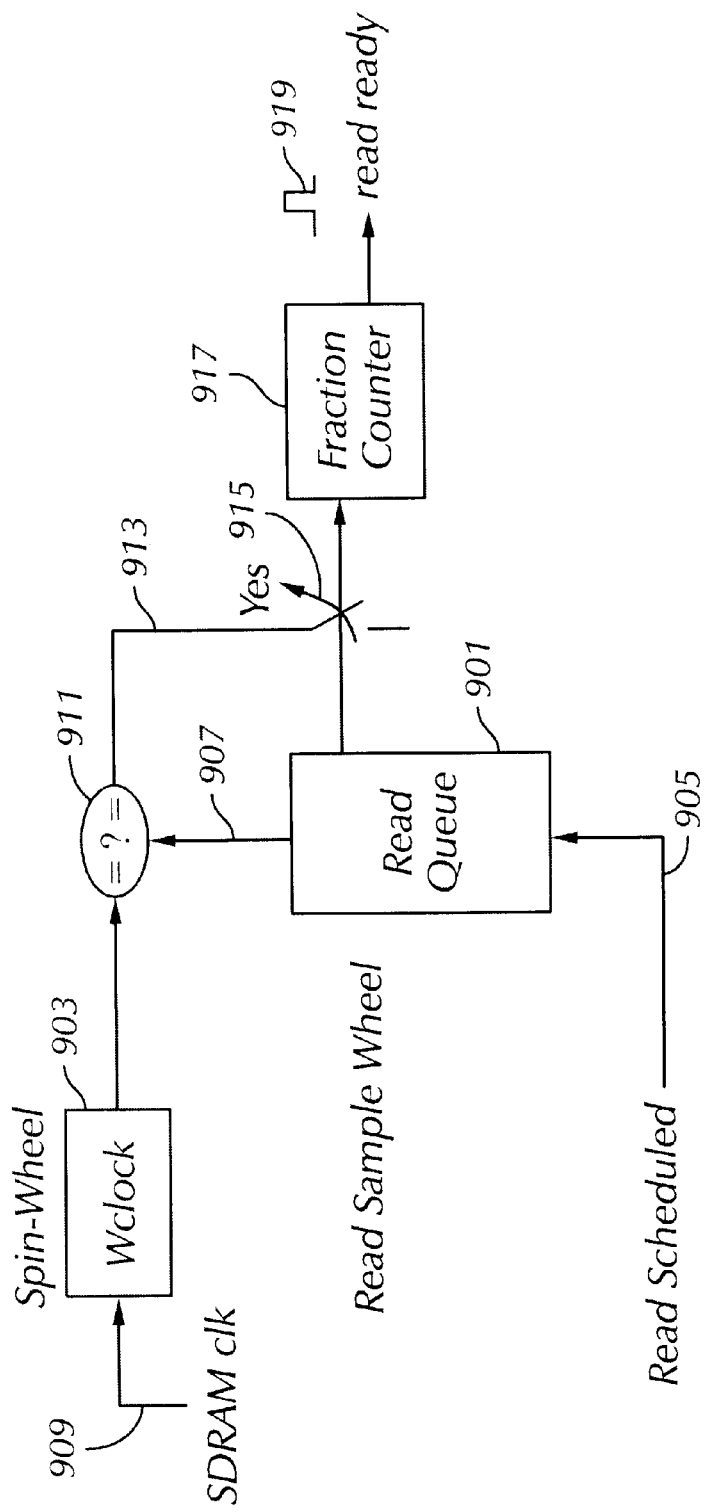
FIG. 9a describes operation of a read sample wheel.

FIG. 9a describes how a read sample wheel 901 operates along with a spin wheel 903 and provides a description that is hardware-implementable in an on-chip MCU. The read sample wheel 901 access is the same as that of the command wheel 801. Since it has only one queue in the wheel, the setting is simple and straightforward. There are two fields in each entry (905) of the read sample wheel register 901. These are:

Request id: this is for data switch to identify the data packet.

smp_tim: it is decided by wclock+X (rd_smp_dly).

Its format is described in Table 2.

The smp_tim 907 of the head entry is compared (911) with wclock, the SDRAM clock time 909, registered by the spin wheel 903. Once the clock matches, it (913) will make the switch 915 trigger the fraction counter 917. The fraction counter 917 is a decrement counter that load the fraction numbers of rd_smp_dly described in Table 2. This mechanism avoids the need for individual counters for every on-going read memory request. The fraction counter outputs the read ready signal 919 to the SDRAM.

Figure 9B:
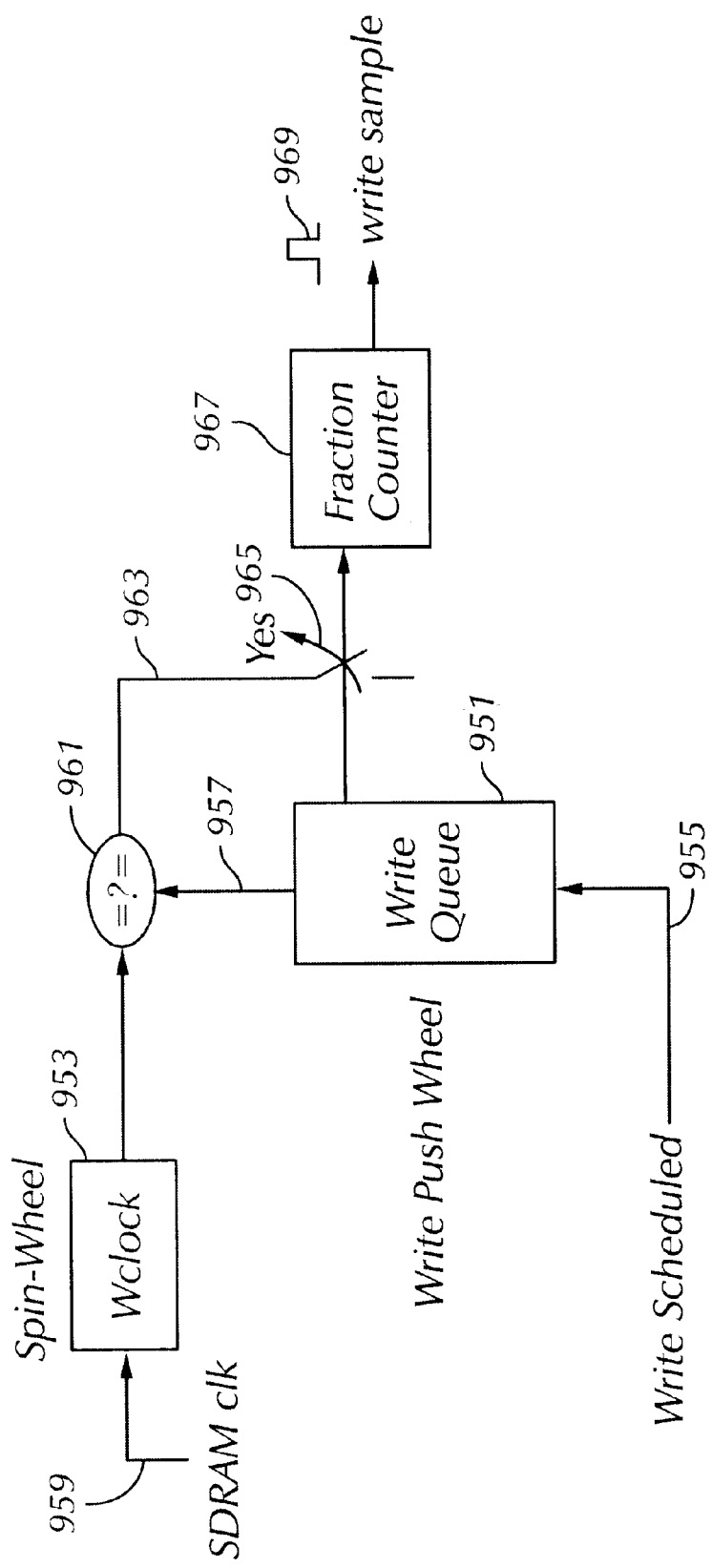
FIG. 9b describes operation of a write push wheel.

FIG. 9b describes how a write push wheel 951 operates along with a spin wheel 953 and provides a description that is hardware implementable in an on-chip MCU. The write push wheel 951 access is the same as that of the command wheel 801. Since it has only one queue in the wheel, the setting is simple and straightforward. There are two fields in each entry (955) of write push wheel register 951 and has the following format:

Request id: this is for data switch to identify the data packet.

psh_tim: it is decided by wclock+X (wr_psh_dly). Its format is described in Table 2.

The psh_tim 957 of the head entry is compared (961) with wclock, the SDRAM clock time 959, registered by the spin wheel 953. Once the clock matches, it will make (963) the switch 965 trigger the fraction counter 967. The fraction counter 967 is a decrement counter that load the fraction number of wr_psh_dly described in Table 2. This mechanism avoids the need for individual counters for every on-going write memory request. The fraction counter 967 outputs the write sample signal 969 to the SDRAM.

Figure 10:
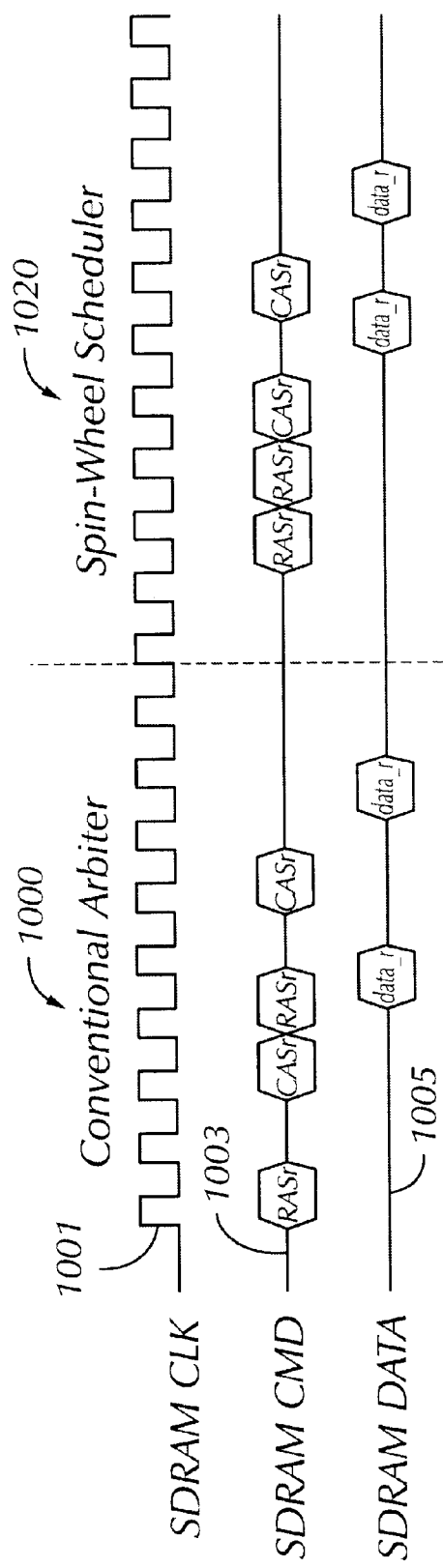
FIG. 10 describes a comparison between a conventional prior art arbiter and a spin-wheel scheduler of one embodiment of the present invention.

FIG. 10 shows two back-to-back memory read scheduling events in a prior art conventional arbiter 1000 and one embodiment of a Spin-Wheel scheduler 1020. The diagram shows the SDRAM clock signal 1001, the SDRAM command signal 1003 and the SDRAM data signal 1005. The spin wheels scheduler 1020 shows latency reduction over the two SDRAM cycles.

In the present invention, a multiple memory bank request sorting problem has been decomposed into a much simpler problem of data structures handled with logic circuits. The complicated timing design and access-scheduling problem has a slow, software-based solution. With this invention, it is now possible to implement a very fast, hardware-based solution, which can be realized in an on-chip MCU. By time efficient use of memory control and data buses, computer memory access performance of a MCU can now be optimized.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. An apparatus for controlling a memory device comprising:
    a command spin wheel that schedules a read or a write command for the memory device, wherein the command spin wheel forms a plurality of first-in, first-out queues and comprises a plurality of pointers;
    a read spin wheel that ensures correct timing of the read command, wherein the read spin wheel forms a first-in, first-out queue and comprises a plurality of pointers; and
    a write spin wheel that ensures correct timing of the write command, wherein the write spin wheel forms a first-in, first-out queue and comprises a plurality of pointers.

2. The apparatus of claim 1, wherein the command spin wheel comprises three pointers.

3. The apparatus of claim 1, wherein the command spin wheel comprises:
    two read pointers; and
    one write pointer.

4. The apparatus of claim 1, wherein the read spin wheel comprises:
    a read pointer; and
    a write pointer.

5. The apparatus of claim 1, wherein the write spin wheel comprises:
    a read pointer; and
    a write pointer.

6. The apparatus of claim 1, wherein the memory device serves a single microprocessor.

7. The apparatus of claim 1, wherein the memory device serves a plurality of microprocessors.

8. An on-chip memory control unit for an SDRAM that serves a plurality of microprocessors, comprising:
    a command spin wheel that schedules read and write commands on a SDRAM command bus in a first-in, first-out order, the command spin wheel comprising,
    an auto-incremental release pointer,
    an auto-incremental CAS pointer, and
    an auto-incremental schedule pointer;
    a read spin wheel that ensures a proper timing sequence of a read command in a first-in, first-out order, the read spin wheel comprising,
    a data read request pointer, and
    a schedule pointer; and
    a write spin wheel that ensures a proper timing sequence of a write command in a first-in, first-out order, the write spin wheel comprising,
    a data push request pointer, and
    a schedule pointer.

9. An apparatus for controlling a memory device comprising:
    means for scheduling a read command or a write command for the memory device, wherein the means for scheduling forms a plurality of first-in, first-out Queues and comprises a plurality of pointers;
    means for ensuring a proper timing sequence for the read command, wherein the means for ensuring a proper timing secuence for the read command forms a first-in, first-out queue and comprises a plurality of pointers; and
    means for ensuring a proper timing sequence for the write command, wherein the means for ensuring a proper timing sequence for the write command forms a first-in, first-out queue and comprises a plurality of pointers.

10. A method for controlling a memory device comprising:
    scheduling a read or a write command for the memory device, wherein the command spin wheel forms a plurality of first-in, first-out queues and comprises a plurality of pointers;
    ensuring a proper timing sequence for a read command, wherein the read spin wheel forms a first-in, first-out queue and comprises a plurality of pointers; and
    ensuring a proper timing sequence for a write command, wherein the write spin wheel forms a first-in, first-out queue and comprises a plurality of pointers.

11. The method of claim 10, wherein scheduling the read or write command is done in a first-in, first-out order.

12. The method of claim 10, wherein ensuring the proper timing sequence of the read command is done in a first-in, first-out order.

13. The method of claim 10, wherein ensuring the proper timing sequence of the write command is done in a first-in, first-out order.

* * * * *